(12) United States Patent
Kim et al.

(10) Patent No.: US 9,738,169 B2
(45) Date of Patent: Aug. 22, 2017

(54) METHOD, APPARATUS, AND COMPUTER READABLE MEDIUM FOR CONTROLLING A WIRELESS CHARGING DEVICE

(71) Applicant: Hyundai Motor Company, Seoul (KR)

(72) Inventors: Do Hoon Kim, Seoul (KR); Zeung Il Kim, Hwaseong (KR)

(73) Assignee: Hyundai Motor Company, Seoul (KR)

( * ) Notice: Subject to any disclaimer, the term of this patent is extended or adjusted under 35 U.S.C. 154(b) by 281 days.

(21) Appl. No.: 14/562,833

(22) Filed: Dec. 8, 2014

(65) Prior Publication Data

US 2016/0046197 A1    Feb. 18, 2016

(30) Foreign Application Priority Data

Aug. 14, 2014 (KR) .................. 10-2014-0105797

(51) Int. Cl.
  B60L 11/18    (2006.01)
(52) U.S. Cl.
  CPC ....... B60L 11/1829 (2013.01); *B60L 2230/14* (2013.01); *Y02T 10/7005* (2013.01); *Y02T 10/7088* (2013.01); *Y02T 90/121* (2013.01); *Y02T 90/122* (2013.01); *Y02T 90/125* (2013.01); *Y02T 90/14* (2013.01)
(58) Field of Classification Search
  CPC .................................................. B60L 11/1829
  See application file for complete search history.

(56) References Cited

U.S. PATENT DOCUMENTS

| | | | |
|---|---|---|---|
| 8,466,660 B2 | 6/2013 | Iizuka et al. | |
| 2006/0129291 A1* | 6/2006 | Lu | B60T 8/17554 701/36 |
| 2015/0298560 A1* | 10/2015 | Keeling | B60L 5/005 191/10 |
| 2015/0352963 A1* | 12/2015 | Grabar | H02J 50/90 320/108 |

FOREIGN PATENT DOCUMENTS

| | | |
|---|---|---|
| JP | 2010-103200 A | 5/2010 |
| JP | 2012-034468 A | 2/2012 |
| JP | 2012-191699 A | 10/2012 |
| KR | 10-2012-0026366 A | 3/2012 |
| KR | 10-2013-0032013 A | 4/2013 |
| KR | 10-2013-0111647 A | 10/2013 |

* cited by examiner

*Primary Examiner* — Jermele M Hollington
*Assistant Examiner* — Feba Pothen
(74) *Attorney, Agent, or Firm* — Mintz Levin Cohn Ferris Glovsky and Popeo, P.C.; Peter F. Corless

(57) ABSTRACT

A method for controlling a wireless charging device includes: receiving information sensed by at least one of a yaw rate sensor, a gyro sensor, and a tire pressure sensor of a vehicle; calculating a longitudinal/transversal gradient of the vehicle according to the received information; and adjusting a height or a gradient of a receiving pad equipped in the vehicle or adjusting a height, a gradient, a transmission power, or a frequency of a transmitting pad corresponding to the receiving pad, based on the calculated longitudinal/transversal gradient.

12 Claims, 4 Drawing Sheets

METHOD, APPARATUS, AND COMPUTER READABLE MEDIUM FOR CONTROLLING A WIRELESS CHARGING DEVICE

CROSS REFERENCE TO RELATED APPLICATION

The present application claims the benefit of and priority to Korean Patent Application Number 10-2014-0105797 filed on Aug. 14, 2014, the entire contents of which are incorporated herein for all purposes by reference.

BACKGROUND

1. Technical Field

The present disclosure relates to a method for controlling a wireless charging device, and more particularly, to a method for controlling a wireless charging device capable of increasing power transmission efficiency by adjusting a vehicle height or a height and gradient of a pad depending on a gradient of a vehicle.

2. Description of the Related Art

Recently, technologies associated with plug-in hybrid vehicles and electric vehicles have been advancing rapidly. The driving force of such vehicles derives, at least in part, from electric energy. There are techniques for charging electric energy including inserting a wired plug connected to a charger into an outlet, as well as wirelessly charging electric energy. Other techniques currently allow a vehicle to recognize a nearby wireless charger when the vehicle approaches the wireless charger, where the recognized wireless charger is arranged as a charging pad in connection with magnetic resonance-based wireless charging.

To increase wireless charging efficiency, it is necessary to accurately arrange positions of coils in a receiving pad equipped in the vehicle and positions of coils in a transmitting pad equipped in the charger. Power transmission efficiency may be maximized when the transmitting pad and the receiving pad are positioned in parallel with each other. On the other hand, a gradient of the receiving pad can be changed based on the gradient of the vehicle, and thus, it may be difficult to maintain parallelism between the receiving pad and the transmitting pad. For example, when the position of the receiving pad in the vehicle is changed, e.g., due to aging of the vehicle, a bumpy road, a tire being worn, etc., the parallelism between the transmitting pad and the receiving pad may not be maintained. Furthermore, with respect to magnetic resonance-based wireless charging, an interval between the transmitting pad and the receiving pad can have a significant effect on the power transmission efficiency.

SUMMARY

An object of the present disclosure is to provide a method for controlling a wireless charging device capable of adjusting an interval between a transmitting pad and a receiving pad and maintaining parallelism therebetween.

According to embodiments of the present disclosure, there is provided a method for controlling a wireless charging device, including: receiving information sensed by at least one of a yaw rate sensor, a gyro sensor, and a tire pressure sensor of a vehicle; calculating a longitudinal/transversal gradient of the vehicle according to the received information; and adjusting a height or a gradient of a receiving pad equipped in the vehicle or adjusting a height, a gradient, a transmission power, or a frequency of a transmitting pad corresponding to the receiving pad, based on the calculated longitudinal/transversal gradient.

In the adjusting, the height or the gradient of the receiving pad or that of the transmitting pad may be adjusted, such that the transmitting pad is positioned in parallel with the receiving pad, and an interval between the transmitting pad and the receiving pad is less than a preset reference value.

In the adjusting, the height or the gradient of the receiving pad or that of the transmitting pad may be adjusted, such that angles of the receiving pad and the transmitting pad, with respect to a straight line connecting central points of the receiving pad and the transmitting pad, are right angles.

In the adjusting, the height or the gradient of the receiving pad or that of the transmitting pad may be adjusted based on an interval of a portion where a distance between the transmitting pad and the receiving pad is closest, such that the transmitting pad and the receiving pad are positioned in parallel with each other.

The adjusting may be performed when the calculated longitudinal/transversal gradient is higher than a preset gradient.

The method may further include after the adjusting, transmitting power and frequency information, indicating a required power and frequency of the receiving pad, to the transmitting pad.

The method may further include calculating power transmission efficiency based on the power and frequency information and power transmitted to the receiving pad.

The method may further include re-adjusting the height of the receiving pad when the calculated power transmission efficiency is equal to or less than a preset tolerance.

The method may further include transmitting an instruction to the transmitting pad to maintain the height of the transmitting pad and the required power and frequency transmitted of the receiving pad, when the calculated power transmission efficiency exceeds a preset tolerance.

The method may further include storing the height of the transmitting pad and the required power and frequency of the receiving pad, when the calculated power transmission efficiency exceeds a preset tolerance.

The transmitting pad may be one of a plurality of transmitting pads.

The method may further include retrieving pre-stored charging information of each of the plurality of transmitting pads when the vehicle approaches the plurality of transmitting pads, wherein the adjusting is performed based on the retrieved charging information when the charging information of a transmitting pad to which the vehicle is approaching is retrieved.

The pre-stored charging information may include one or more of a height, a transmission power, and frequency information of the plurality of transmitting pads at a time of pre-charging, the plurality of transmitting pads being arranged depending on positions thereof as determined by a global positioning system (GPS).

Furthermore, according to embodiments of the present disclosure, there is provided an apparatus for controlling a wireless charging device, including: a memory storing program instructions; and a processor configured to execute the stored program instructions, which when executed perform a process including: receiving information sensed by at least one of a yaw rate sensor, a gyro sensor, and a tire pressure sensor of a vehicle, calculating a longitudinal/transversal gradient of the vehicle according to the received information, and adjusting a height or a gradient of a receiving pad equipped in the vehicle or adjusting a height, a gradient, a transmission power, or a frequency of a transmitting pad corresponding to the receiving pad, based on the calculated longitudinal/transversal gradient.

Furthermore, according to embodiments of the present disclosure, there is provided a non-transitory computer readable medium containing program instructions for controlling a wireless charging device, including: program instructions that receive information sensed by at least one of a yaw rate sensor, a gyro sensor, and a tire pressure sensor of a vehicle; program instructions that calculate a longitudinal/transversal gradient of the vehicle according to the received information; and program instructions that adjust a height or a gradient of a receiving pad equipped in the vehicle or adjusting a height, a gradient, a transmission power, or a frequency of a transmitting pad corresponding to the receiving pad, based on the calculated longitudinal/transversal gradient.

BRIEF DESCRIPTION OF THE DRAWINGS

The above and other objects, features and advantages of the present disclosure will be more clearly understood from the following detailed description taken in conjunction with the accompanying drawings, in which.

DETAILED DESCRIPTION OF THE EMBODIMENTS

Figure 1:
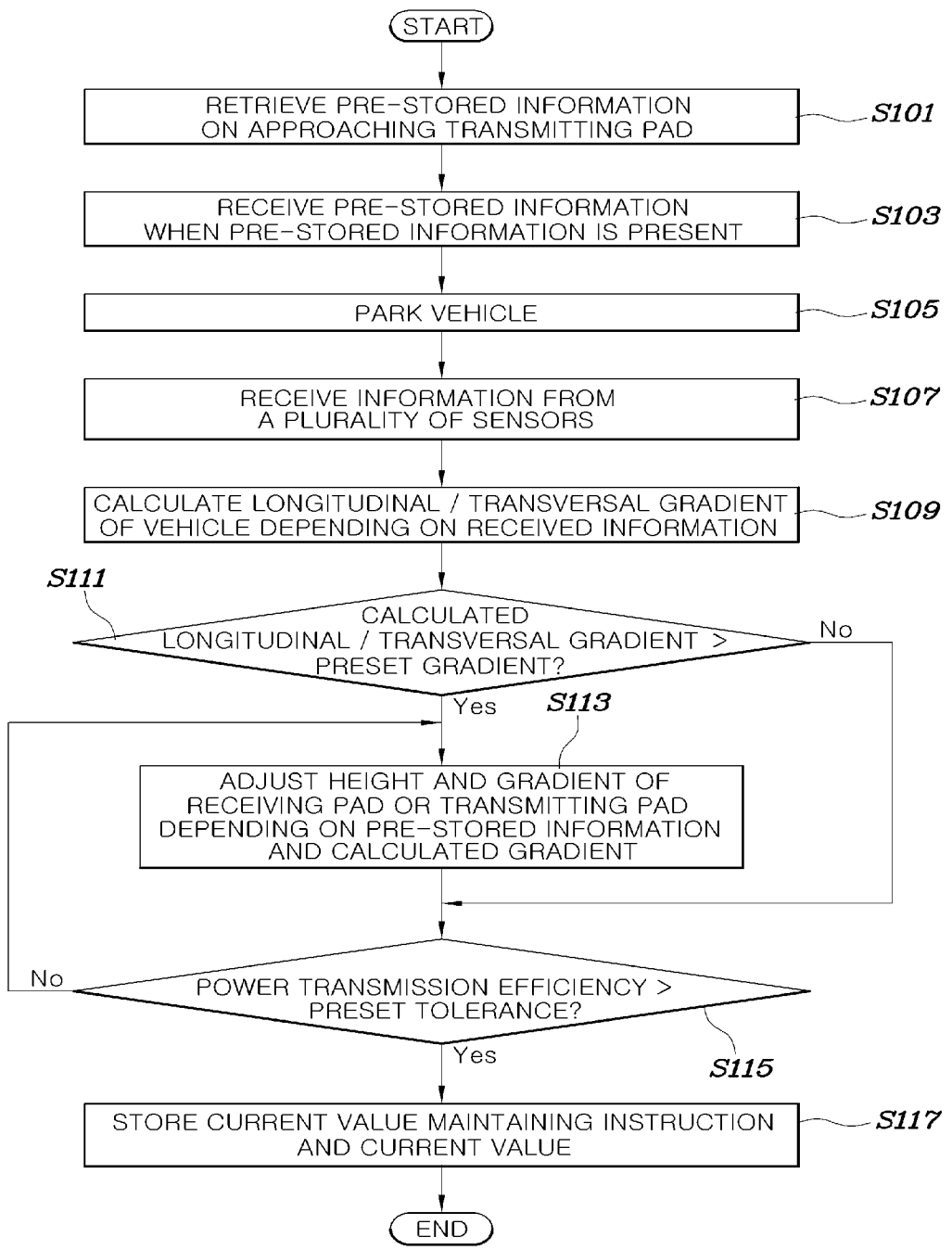
FIG. 1 is a flow chart illustrating a method for controlling a wireless charging device according to embodiments of the present disclosure.

Specific structural and functional descriptions of the present disclosure disclosed in the present specification are illustrated to describe embodiments of the present disclosure. Therefore, the present disclosure may be practiced in various forms and should not be construed as being limited to the embodiments disclosed herein. The embodiments of the present disclosure may be modified and have various forms. Therefore, it is to be understood that the present disclosure is not limited to the disclosed embodiments, but includes all modifications, equivalents, and substitutions included in the spirit and the scope of the present disclosure.

Terms such as 'first', and/or 'second', etc., may be used to describe various components, but the components are not to be construed as being limited to the terms. The terms are used only to distinguish one component from another component. For example, the 'first' component may be named the 'second' component and the 'second' component may also be similarly named the 'first' component, without departing from the scope of the present disclosure.

It is to be understood that when one element is referred to as being "connected to" or "coupled to" another element, it may be connected directly to or coupled directly to another element or be connected to or coupled to another element, having the other element intervening therebetween. On the other hand, it is to be understood that when one element is referred to as being "connected directly to" or "coupled directly to" another element, it may be connected to or coupled to another element without the other element intervening therebetween. Other expressions describing a relationship between components, that is, "between", "directly between", or "neighboring to", "directly neighboring to" and the like, should be similarly interpreted.

Terms used in the present specification are used only in order to describe embodiments rather than limiting the present disclosure. Singular forms are intended to include plural forms unless the context clearly indicates otherwise. It will be further understood that the terms "comprises" or "have" used in this specification, specify the presence of stated features, numerals, steps, operations, components, parts, or a combination thereof, but do not preclude the presence or addition of one or more other features, numerals, steps, operations, components, parts, or a combination thereof.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

Additionally, it is understood that one or more of the below methods, or aspects thereof, may be executed by at least one controller. The term "controller" may refer to a hardware device that includes a memory and a processor. The memory is configured to store program instructions, and the processor is configured to execute the program instructions to perform one or more processes which are described further below. Moreover, it is understood that the below methods may be executed by an apparatus comprising the controller, whereby the apparatus is known in the art to be suitable for controlling a wireless charging device.

Furthermore, the controller of the present disclosure may be embodied as non-transitory computer readable media on a computer readable medium containing executable program instructions executed by a processor, controller or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

Unless indicated otherwise, it is to be understood that all the terms used in the specification including technical or scientific terms have the same meaning as those that are understood by those who skilled in the art. It must be understood that the terms defined by the dictionary are identical with the meanings within the context of the related art, and they should not be ideally or excessively formally interpreted unless the context clearly defined otherwise.

Hereinafter, embodiments of the present disclosure will be described in detail with reference to the accompanying drawings. Like reference numerals proposed in each drawing denote like components.

Figure 2:
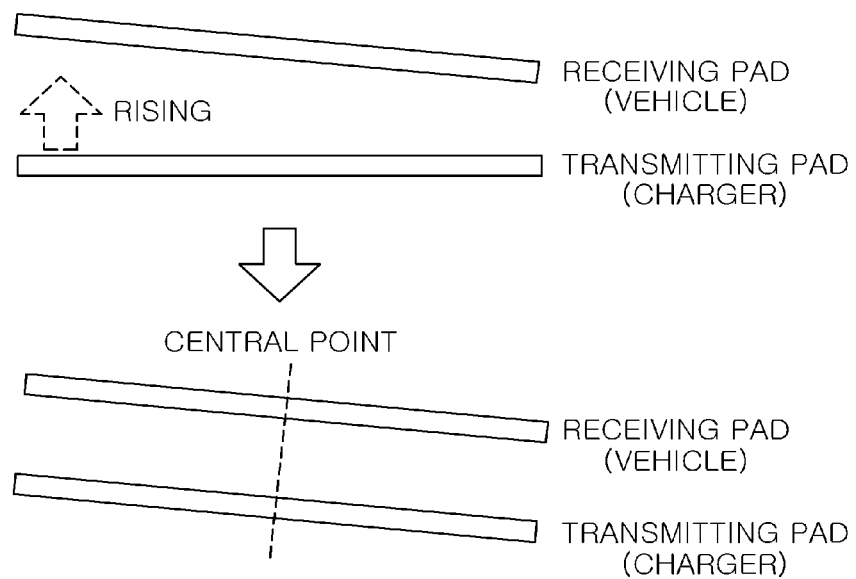
FIG. 2 is a diagram illustrating an example of adjusting a gradient of a receiving pad.

FIG. 1 is a flow chart illustrating a method for controlling a wireless charging device according to embodiments of the present disclosure. A subject of the method for controlling a wireless charging device according to embodiments of the present disclosure is a controller of a receiving pad which is equipped in a vehicle. Further, FIG. 2 is a diagram illustrating an example of adjusting a gradient of the receiving pad.

Referring to FIG. 1, the controller of the receiving pad first figures out whether pre-stored information on the transmitting pad to which a vehicle is currently approaching is present (S101). The pre-stored information is used at the time of charging. The pre-stored information may include at least one of heights, transmission power, and frequency information of the transmitting pads at the time of pre-charging, which are arranged depending on positions of the transmitting pads which may be decided by GPS. In detail, a driver may figure out the position of the transmitting pad by the GPS and the controller may store the position of the transmitting pad in the storage unit. Further, the controller figures out pre-stored charging record for the transmitting pad which is positioned at a predetermined position to be able to understand the heights and gradients of the transmitting pad and the receiving pad and charging power and frequency information of the transmitting pad. That is, the controller may receive the information, which is pre-stored in the storage unit, from the storage unit (S103).

After a vehicle is parked proximately to the transmitting pad to which the vehicle is approaching (S105), the controller receives information sensed by at least one of a yaw rate sensor, a gyro sensor, and a tire pressure sensor which are included inside the vehicle (S107). In detail, the yaw rate sensor may be included in an electronic stability control (ESC), and a value sensed by the yaw rate sensor may be transmitted from an ESC controller to the controller of the receiving pad. Further, the gyro sensor may be included in an audio video navigation (AVN) system, and a value sensed by the gyro sensor may be transmitted from an AVN controller to the controller of the receiving pad. Further, the tire pressure sensor may be included in a tire pressure monitoring system (TPMS), and a value sensed by the tire pressure sensor may be transmitted from a TPMS controller to the controller of the receiving pad.

The controller of the receiving pad may calculate longitudinal/transversal gradient information of the vehicle based on the transmitted sensing value (S109). The controller of the receiving pad determines whether the calculated longitudinal/transversal gradient of the vehicle is larger than a preset longitudinal/transversal gradient (S111). That is, the controller of the receiving pad may adjust the height and/or gradient of the receiving pad or that of the transmitting pad based on the calculated longitudinal/transversal gradient and the pre-stored information (e.g., when the pre-stored information is present in S103) when the calculated longitudinal/transversal gradient is even larger than the gradient of the vehicle which may be determined to be in a normal range (S113).

In detail, the required height of the receiving pad is calculated by the controller of the receiving pad, and the calculated height is transmitted to the controller of the ESC through high-speed controller area network (CAN) communication in order to adjust the vehicle height. The required height of the transmitting pad is calculated by the controller of the receiving pad based on the current height of the transmitting pad, as well as the power and frequency output from the transmitting pad, and the calculated height is transmitted to the controller of the transmitting pad through the high-speed CAN communication. Therefore, the height, output power, and frequency of the transmitting pad may be adjusted.

Further, as illustrated in FIG. 2, the controller of the receiving pad may adjust the height and gradient of the receiving pad or the transmitting pad so that the transmitting pad is positioned in parallel with the receiving pad, and the interval between the transmitting pad and the receiving pad is less than the preset reference value.

Further, as illustrated in FIG. 2, the controller of the receiving pad may adjust the heights and/or gradients of the receiving pads or that of the transmitting pads, such that each of the angles of the receiving pads and the transmitting pads, with respect to straight lines connecting central points of the receiving pads and the transmitting pads, is a right angle. Moreover, the controller of the receiving pad may adjust the height and/or gradient of the receiving pad or that of the transmitting pad based on the interval of a portion where a distance between the transmitting pad and the receiving pad is closest, such that the transmitting pad and the receiving pad are positioned in parallel with each other.

The height of the receiving pad and the height, output power, frequency, and the like of the transmitting pad can be adjusted, and then, the controller of the receiving pad calculates the charging efficiency (i.e., wireless power transmission efficiency) from the transmitting pad. Prior to the calculation, the controller of the receiving pad may transmit the required power and frequency information of the receiving pad to the transmitting pad-side. The controller of the receiving pad may calculate the power transmission efficiency based on the information transmitted to the transmitting pad, in addition to the power transmitted to the receiving pad.

The controller of the receiving pad compares the calculated power transmission efficiency to a preset tolerance (S115), and when the calculated power transmission efficiency exceeds the preset tolerance, may transmit an instruction to maintain the height of the transmitting pad and the required power and frequency transmitted to the transmitting pad (S117).

Further, the controller of the receiving pad may store the height of the transmitting pad and required the power and frequency information transmitted to the transmitting pad in the storage unit when the calculated power transmission efficiency exceeds the preset tolerance (S117). The adjustment of the frequency transmitted from the transmitting pad may include the adjustment of the magnitude and/or phase of the frequency. When the transmitting coil and the receiving coil are matched one to one, the phase adjustment may not be performed, but when any one of the transmitting coil and the receiving coil is configured in plural (i.e., there are multiple transmitting coils and/or receiving coils), both of the phase adjustment and the magnitude adjustment may be performed. Here, when the calculated power transmission efficiency is equal to or less than the preset tolerance, the controller of the receiving pad may re-adjust the height of the receiving pad based on the calculated longitudinal/transversal gradient and the pre-stored information (when the pre-stored information is present in S103).

Figure 3A:
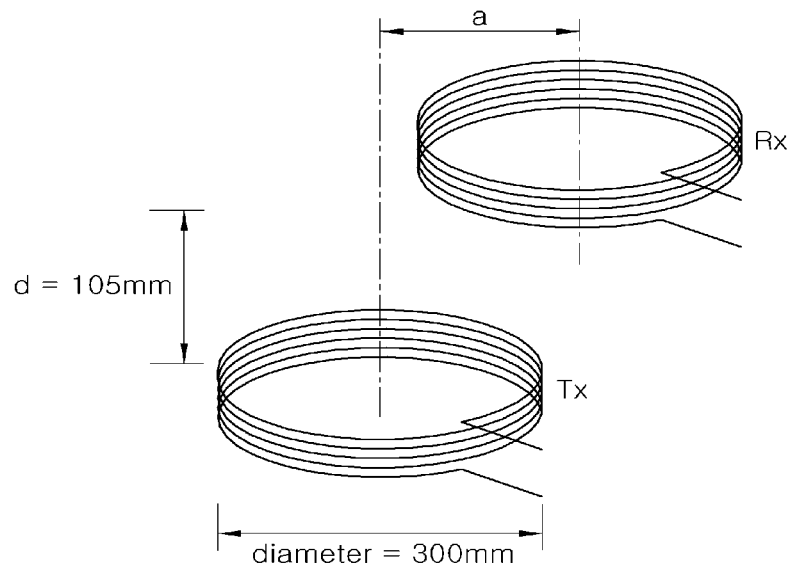
FIGS. 3A and 3B are diagrams illustrating power transmission efficiency depending on a change in central positions of coils which are equipped in a transmitting pad and the receiving pad, respectively.
Figure 3B:
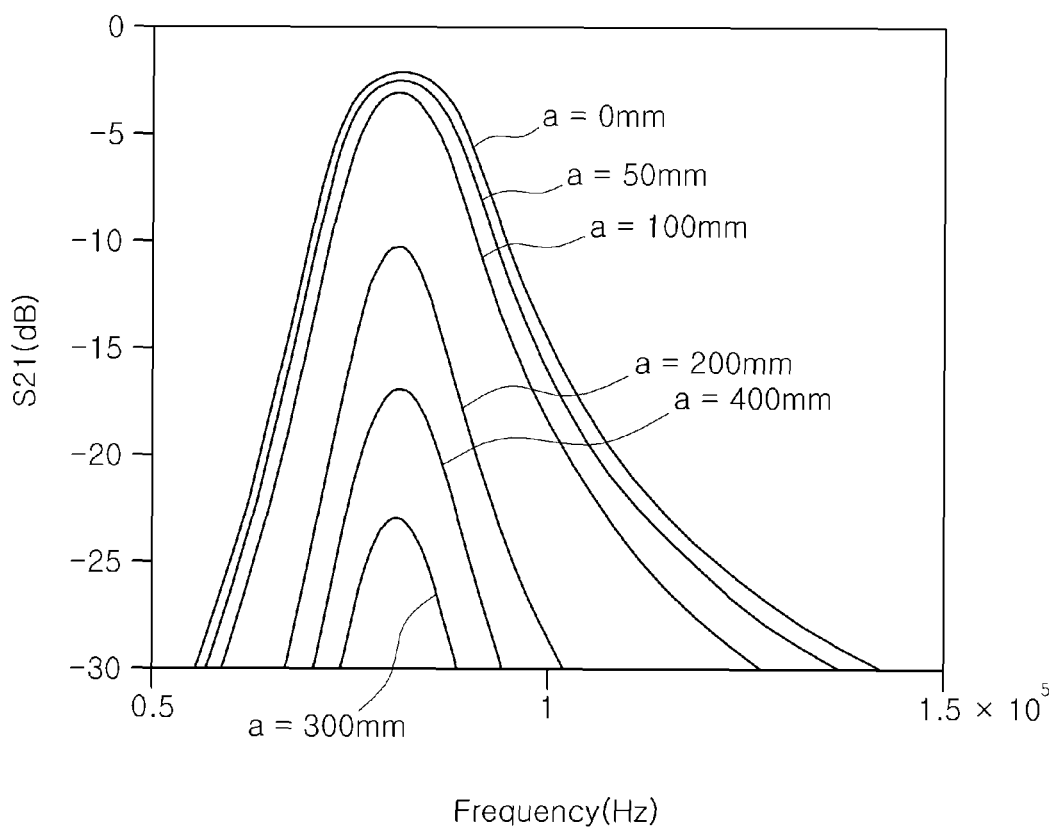

FIGS. 3A and 3B are diagrams illustrating power transmission efficiency depending on a change in central positions of coils which are equipped in a transmitting pad and the receiving pad, respectively. Referring to FIGS. 3A and 3B, the power transmission efficiency may be changed depending on a mismatch degree 'a' of the interval between the central points of the transmitting coil included in the transmitting pad and the receiving coil included in the receiving pad (i.e., under the condition that interval between the transmitting pad and the receiving pad is the same). That is, the controller of the receiving pad may adjust the gradient of the receiving pad or the transmitting pad so that each of the angles of the receiving pads and the transmitting pads, with respect to the straight lines connecting the central points of the receiving pads and the transmitting pads, is a right angle.

Figure 4:
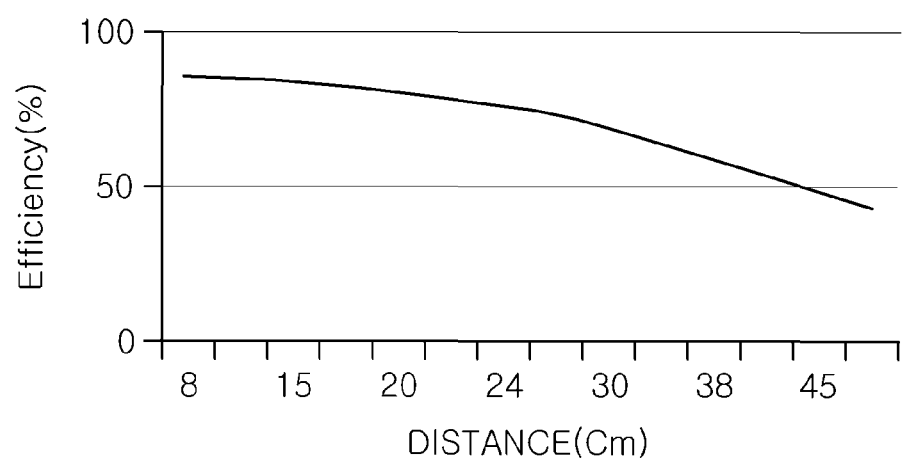
FIG. 4 is a graph illustrating the power transmission efficiency depending on an interval between the transmitting pad and the receiving pad.

FIG. 4 is a graph illustrating the power transmission efficiency depending on an interval between the transmitting pad and the receiving pad. Referring to FIG. 4, as the interval between the transmitting pad and the receiving pad increases, the power transmission efficiency decreases. That is, when the transmitting pad and the receiving pad are not positioned in parallel with each other on the entire surface, and thus, the interval between the transmitting pad and the receiving pad is partially different, the gradient and/or height of the transmitting pad or that of the receiving pad may be adjusted based on a minimum interval between the transmitting pad and the receiving pad, such that the transmitting pad and the receiving pad are positioned in parallel with each other.

As described above, according to the method for controlling a wireless charging device in accordance with embodiments of the present disclosure, it is possible to increase the charging efficiency at the time of the wireless charging by reducing the interval between the transmitting pad and the receiving pad, while maintaining the parallelism between the transmitting pad and the receiving pad. It is also possible to use the previous charging data at the time of charging by storing one or more of the positions of each transmitting pad, the heights of the transmitting pad and the receiving pad at the time of pre-charging, and the transmission power and frequency of the transmitting pad.

Although the present disclosure has been described with reference to embodiments shown in the accompanying drawings, they are only examples. Therefore, it will be appreciated by those skilled in the art that various modifications and equivalent other embodiments are possible from the present disclosure. Accordingly, an actual technical protection scope of the present disclosure is to be defined by the following claims.

What is claimed is:

1. A method for controlling a wireless charging device, comprising:
   receiving information sensed by at least one of a yaw rate sensor, a gyro sensor, and a tire pressure sensor of a vehicle;
   calculating a longitudinal/transversal gradient of the vehicle according to the received information;
   adjusting a height or a gradient of a receiving pad equipped in the vehicle or adjusting a height, a gradient, a power transmitted to the receiving pad, or a frequency of a transmitting pad corresponding to the receiving pad, based on the calculated longitudinal/transversal gradient;
   transmitting power and frequency information, including a required power and frequency of the receiving pad, to the transmitting pad;
   calculating power transmission efficiency based on the power and frequency information and power transmitted to the receiving pad; and
   re-adjusting the height of the receiving pad when the calculated power transmission efficiency is equal to or less than a present tolerance.

2. The method of claim 1, wherein in the adjusting, the height or the gradient of the receiving pad or that of the transmitting pad is adjusted, such that the transmitting pad is positioned in parallel with the receiving pad, and an interval between the transmitting pad and the receiving pad is less than a preset reference value.

3. The method of claim 1, wherein in the adjusting, the height or the gradient of the receiving pad or that of the transmitting pad is adjusted, such that angles of the receiving pad and the transmitting pad, with respect to a straight line connecting central points of the receiving pad and the transmitting pad, are right angles.

4. The method of claim 1, wherein in the adjusting, the height or the gradient of the receiving pad or that of the transmitting pad is adjusted based on an interval of a portion where a distance between the transmitting pad and the receiving pad is closest, such that the transmitting pad and the receiving pad are positioned in parallel with each other.

5. The method of claim 1, wherein the adjusting is performed when the calculated longitudinal/transversal gradient is higher than a preset gradient.

6. The method of claim 1, further comprising:
   after the calculating of the power transmission efficiency or the re-adjusting of the height of the receiving pad, transmitting an instruction to the transmitting pad to maintain the height of the transmitting pad and the required power and frequency pad, when the calculated power transmission efficiency exceeds a preset tolerance.

7. The method of claim 1, further comprising:
   after the calculating of the power transmission efficiency or the re-adjusting of the height of the receiving pad, storing the height of the transmitting pad and the required power and frequency of the receiving pad, when the calculated power transmission efficiency exceeds a preset tolerance.

8. The method of claim 1, wherein the transmitting pad is one of a plurality of transmitting pads.

9. The method of claim 8, further comprising:
   after the calculating of the longitudinal/transversal gradient, retrieving pre-stored charging information of each of the plurality of transmitting pads when the vehicle approaches the plurality of transmitting pads,
   wherein the adjusting is performed based on the retrieved charging information when the charging information of a transmitting pad to which the vehicle is approaching is retrieved.

10. The method of claim 9, wherein the pre-stored charging information includes one or more of a height, a transmission power, and frequency information of the plurality of transmitting pads at a time of pre-charging, the plurality of transmitting pads being arranged depending on positions thereof as determined by a global positioning system (GPS).

11. An apparatus for controlling a wireless charging device, comprising:
   a memory storing program instructions; and
   a processor configured to execute the stored program instructions, which when executed perform a process including:
      receiving information sensed by at least one of a yaw rate sensor, a gyro sensor, and a tire pressure sensor of a vehicle,
      calculating a longitudinal/transversal gradient of the vehicle according to the received information,
      adjusting a height or a gradient of a receiving pad equipped in the vehicle or adjusting a height, a gradient, a power transmitted to the receiving pad, or a frequency of a transmitting pad corresponding to the receiving pad, based on the calculated longitudinal/transversal gradient,
      transmitting power and frequency information, indicating a required power and frequency of the receiving pad, to the transmitting pad, calculating power transmission efficiency based on the power and frequency information and power transmitted to the receiving pad, and re-adjusting the height of the receiving pad when the calculated power transmission efficiency is equal to or less than a preset tolerance.

12. A non-transitory computer readable medium containing program instructions for controlling a wireless charging device, the computer readable medium comprising:

program instructions that receive information sensed by at least one of a yaw rate sensor, a gyro sensor, and a tire pressure sensor of a vehicle;

program instructions that calculate a longitudinal/transversal gradient of the vehicle according to the received information;

program instructions that adjust a height or a gradient of a receiving pad equipped in the vehicle or adjusting a height, a gradient, a power transmitted to the receiving pad, or a frequency of a transmitting pad corresponding to the receiving pad, based on the calculated longitudinal/transversal gradient;

program instructions that transmit power and frequency information, indicating a required power and frequency of the receiving pad, to the transmitting pad;

program instructions that calculate power transmission efficiency based on the power and frequency information and power transmitted to the receiving pad; and program instructions that re-adjust the height of the receiving pad when the calculated power transmission efficiency is equal to or less than a preset tolerance.

* * * * *